May 14, 1940. C. E. JENNINGS 2,200,988
SHAFT LOCKING DEVICE
Filed Feb. 3, 1938

Inventor:
Clair E. Jennings,
by Harry E. Dunham
His Attorney.

Patented May 14, 1940

2,200,988

UNITED STATES PATENT OFFICE 2,200,988

SHAFT LOCKING DEVICE

Clair E. Jennings, Schenectady, N. Y., assignor to General Electric Company, a corporation of New York Application February 3, 1938, Serial No. 188,515

7 Claims. (Cl. 188—67)

My invention relates to improvements in locking devices for a rotatable shaft and more particularly to an improved locking device for locking in adjusted position a shaft provided for purposes of adjusting or setting electrical or mechanical devices.

The invention has for one of its objects to provide a locking arrangement which will enable critical adjustments to be made in the value of an adjustable device as, for example, electrical condensers of adjustable capacity, rheostats, potentiometers, and the like, and which will thereafter accurately maintain such critical adjustment over long periods of time.

Another object of my invention is to provide a shaft lock which may be operated to locking position by a locking tool having a longitudinal axis nearly coaxial with that of the shaft with which my lock may be employed.

An additional object of my invention is to provide a shaft locking arrangement which utilizes the static frictional force between the shaft and one or more aligned shaft bearings and my invention contemplates varying the magnitude of such force by a controlled displacement of one shaft bearing out of alignment with one or more of the other shaft bearings.

A further object of my invention is to provide an arrangement for accurately locking a shaft in adjusted position by the provision of shaft bearings displaceable out of axial alignment, the displacement being under minute control through an arrangement of cooperating surfaces inclined at an angle to the axis of the shaft.

Another object of my invention is to provide a shaft lock which enables an exceptionally accurate and rapid locking of a shaft against rotation yet one which is simple and rugged in construction, of small size, and easily adaptable for use with the shaft of any adjustable device.

The novel features which I believe to be characteristic of my invention are set forth with particularity in the appended claims. My invention itself, both as to its organization and method of operation, together with further objects and advantages thereof may best be understood by reference to the following description taken in connection with the accompanying drawing in which Fig. 1 is a side elevation of my shaft lock and Fig. 2 is a front elevation thereof.

Figure 1:
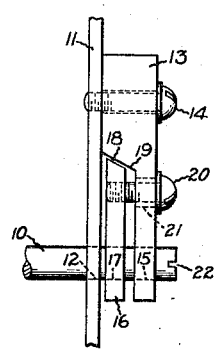
Figure 2:
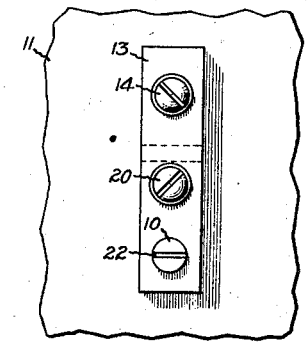

Referring particularly to Fig. 1 of the drawing, I have illustrated my invention as embodied in an arrangement for locking a shaft 10 in adjusted position. The shaft 10 extends to the left for connection with an adjustable device, not shown. The right-hand end of the shaft is supported by a bearing member 11 provided with a bearing surface 12. The member 11 may, for example, constitute the panel of an enclosing housing used to support and protect the adjustable device, not shown. A second bearing for the right-hand end of the shaft 10 is provided by a bearing member 13 which is fixedly secured to the member 11, as by a screw 14. The bearing member 13 is provided with a bearing surface 15 in coaxial alignment with the bearing surface 12.

A third and displaceable bearing for the shaft 10 is provided by a bearing member 16 which, when not locking the shaft 10 in a manner to be described hereinafter, is supported for limited longitudinal motion along the shaft 10 by a bearing surface 17. The bearing member 16 has an inclined surface 18 which may be moved by tightening a screw 20 into engaging relation with a similar inclined surface 19 formed on the bearing member 13. The screw 20 is guided in a limited movement radially of the shaft 10 by an elongated slot 21.

The shaft 10 may be rotated to effect an adjustment of the adjustable device, not shown, by any suitable means as, for example, a slot 22 which may be engaged by the end of a screw driver or like tool.

The operation of my shaft lock will now be evident. While making an adjustment of the device to which the left-hand end of the shaft 10 is secured, the screw 20 is loosened. A screw driver or similar tool is inserted in the slot 22 and the shaft 10 is rotated to effect a suitable adjustment. To lock the shaft 10 in this adjusted position, it is only necessary to tighten the screw 20 which thereupon moves the bearing member 16 longitudinally of the shaft 10 to cause the inclined surfaces 18 and 19 to engage and thereafter to exert a force on the bearing member 16 tending to displace it in a direction transverse to the axis of the shaft 10. The slot 21 in the bearing member 13 permits the bearing member 16 and the screw 20 to move transversely of the shaft axis during the locking operation, yet prevents even small movements of the bearing 16 and screw 20 around the axis of the shaft. The static frictional force between the bearing surfaces 12, 15 and 17 and the shaft 10 greatly increases in magnitude as the screw 20 is tightened to force the displaceable bearing member 16 against the shaft and eventually becomes so large that the shaft 10 is held against rotation. The adjustable device is thus locked in adjusted position.

The magnitude of the force exerted on the displaceable bearing member 16 depends upon the angle which the inclined surfaces 18 and 19 make with the axis of the shaft 10 and upon the force applied in tightening the screw 20. It should be noted that, in practice, the bearing members 11 and 13 do not have a wide space between them as would be indicated from the drawing, which is illustrative only, but are arranged to allow comparatively limited movement of the bearing member 16 longitudinally of the shaft 10 sufficient to accomplish locking and unlocking of the shaft 10 consistent with normal wear of the several bearing surfaces 12, 15 and 17 and wear of the cooperating surfaces 18 and 19 during normal life of the locking device. The close spacing of the bearing members 11 and 13 insures that the shaft 10 will not be appreciably deflected upon application of the locking force provided by the bearing member 16.

My shaft lock has the very important advantage over the prior art shaft locking arrangements that the locking tool may be manipulated from a position in front of the member 11 which frequently will be one panel of an enclosing housing for the adjustable device, not shown. Further, the longitudinal axis of the locking tool will, with my arrangement, extend forward parallel with and closely adjacent to the axis of the shaft with which my lock may be employed, a circumstance giving rise to the additional advantage that the right-hand end of the shaft 10 may extend a minimum distance in front of the member 11.

It will now be evident that I have provided an arrangement wherein one of a plurality of normally aligned shaft bearings has a force applied in a direction tending to move the one bearing out of alignment with the other bearings for the purpose of increasing the magnitude of the static frictional force between the shaft and its bearings whereby the shaft is locked against further rotation. It will further be evident that a shaft lock constructed in accordance with my invention is, due to the direction of applying the locking pressure on the shaft, quite free from any tendency to rotate the shaft during the locking operation.

While I have illustrated a shaft lock provided with two fixed bearings 11 and 13 and a displaceable bearing 16, it will be evident that one of the bearings 11 or 13 may be dispensed with and only the other bearing used. It will, of course, be understood that I do not wish to be limited to the particular embodiment of my invention which I have shown since many modifications may be made both in the mechanical arrangement and the instrumentalities employed, and I therefore contemplate by the appended claims to cover any such modifications as fall within the true spirit and scope of my invention.

What I claim as new and desire to secure by Letters Patent of the United States is:

1. In combination, a shaft rotatable about its axis, means for rotating said shaft, means forming a plurality of axially aligned non-rotatable bearings for said shaft, means for locking said shaft against rotation, said last named means including means for applying to at least one of said bearings a force acting radially of said shaft and tending to displace said bearings from said axial alignment, and means responsive to said force to increase the pressure which said shaft exerts on said bearings.

2. A shaft lock comprising, in combination, a shaft rotatable about its axis, means for rotating said shaft, a plurality of members having axially aligned non-rotatable bearing surfaces for said shaft, means for moving one of said members longitudinally of said shaft, and means responsive to the longitudinal movement of said one member along said shaft for increasing the bearing pressure between said shaft and said bearing surfaces to lock said shaft against rotation.

3. The combination, in a shaft lock, of a shaft rotatable about its axis, means for rotating said shaft, a plurality of members having axially aligned non-rotatable bearing surfaces arranged to retain said shaft in axial position, means for moving one of said members relative to a second of said members in a direction longitudinally of said shaft, means including cooperating surfaces on said first and said second members for developing from said longitudinal movement a force tending to displace said bearing surfaces from said axial alignment, and means responsive to said force for increasing the pressure which the shaft exerts on said bearing surfaces to lock said shaft against rotation.

4. In combination, a shaft rotatable about its axis, means for rotating said shaft, a plurality of non-rotatable members each having an axially aligned bearing for said shaft, means for moving a first of said members relative to a second of said members in a direction longitudinally of said shaft, cooperating surfaces on said first and second members inclined at an angle to the axis of said shaft, and means including said surfaces and utilizing the longitudinal movement of said first member for locking said shaft against rotation by the frictional engagement between said shaft and said bearings.

5. The combination, in a shaft lock, of a shaft, means journalling said shaft for rotation about its axis, means for rotating said shaft to effect a desired rotational adjustment, and means for locking said shaft in said adjusted position, said last named means including a locking actuator having an axis of rotation parallel to the axis of said shaft, and means responsive to the rotation of said actuator for controlling the radial pressure of said first named means on said shaft.

6. The combination, in a shaft lock, of a shaft rotatable about its axis to a selected position, a plurality of aligned stationary bearings for said shaft, a member journaled on and movable longitudinally of said shaft, means responsive to the longitudinal position of said member along said shaft for controlling the pressure which said shaft exerts on said bearings, and means for moving said member to selectable positions along said shaft.

7. In combination, a shaft rotatable about its axis to a selected position, a bearing for said shaft, a member journaled on and movable longitudinally of said shaft, means responsive to the longitudinal position of said member along said shaft for controlling the pressure which said shaft exerts on said bearing, and means for locking said shaft against rotation in a selected position, said means including a locking actuator having an axis of rotation parallel to the axis of said shaft, and means responsive to the rotation of said actuator for controlling the longitudinal position of said member along said shaft.

CLAIR E. JENNINGS.